United States Patent
Wei et al.

(10) Patent No.: US 8,405,619 B2
(45) Date of Patent: Mar. 26, 2013

(54) INPUT METHOD FOR TOUCH SCREEN

(75) Inventors: Gang Wei, Beijing (CN); Cheng Chen, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 973 days.

(21) Appl. No.: 12/119,006

(22) Filed: May 12, 2008

(65) Prior Publication Data

US 2008/0309639 A1 Dec. 18, 2008

(30) Foreign Application Priority Data

Jun. 18, 2007 (CN) .......................... 2007 1 0119015

(51) Int. Cl.
*G06F 3/041* (2006.01)
(52) U.S. Cl. ........................................ 345/173; 345/156
(58) Field of Classification Search .................. 345/173
See application file for complete search history.

(56) References Cited

U.S. PATENT DOCUMENTS

| 2005/0046621 | A1* | 3/2005 | Kaikuranta | 345/173 |
| 2006/0197752 | A1* | 9/2006 | Hurst et al. | 345/173 |
| 2006/0198204 | A1 | 9/2006 | Lambrache et al. | |

FOREIGN PATENT DOCUMENTS

| KR | 2001-0046646 A | 6/2001 |
| KR | 2001046646 A | * 6/2001 |

* cited by examiner

*Primary Examiner* — Amare Mengistu
*Assistant Examiner* — Jennifer Zubajlo
(74) *Attorney, Agent, or Firm* — Dickstein Shapiro LLP

(57) ABSTRACT

The present invention discloses an input method for a touch screen comprising a first step of acquiring the coordinates of all current touch points on the touch screen, the method further comprises steps of: (a) comparing and determining whether the distance between any two of the uncompared touch points on the touch screen is greater than or equal to a preset distance, executing the right-key operation of a mouse at the current position of the pointer of the mouse and terminating the current processing flow if it is positive, otherwise proceeding to step (b) if it is negative; (b) determining whether comparison has been made to the distances of all the touch points on the touch screen, and calculating the average of the coordinates of all the current touch points if they have been compared, otherwise returning to step (a). The method of the present invention can implement the right-key function on the touch screen in a convenient, rapid and accurate manner.

6 Claims, 2 Drawing Sheets

INPUT METHOD FOR TOUCH SCREEN

BACKGROUND OF THE INVENTION

1. Field of Invention

The present invention relates to the touch sensitive technology for electronics, and in particular to an input method for touch screen.

2. Description of Prior Art

With the computer's role as information source being of a growing importance, the technology of touch screen has made a remarkable progress. As one of the latest computer input devices, the touch screen is generally attached to the surface of a display and used with it in cooperation. If the coordinate of a touch point on a screen can be measured, the intention of a user touching the screen can be grasped according to display content or icons corresponding to the coordinate on the display screen. The touch screen has additional advantages such as easy to use, solid, durable, rapid response and space-efficient. As a result, multiple types of touch screens have emerged, such as resistance-type, capacitance-type, infrared-type and surface sound wave-type. Taking into account of relevant factors, for example, cost, easiness in use and accuracy, the resistance-type touch screen dominates the market at present.

The resistance-type touch screen is a transparent four-layer compound screen of thin film, with the bottom being a base layer made of glass or organic glass, the top being a plastic layer whose outer surface has undergone cure process and thus becomes smooth and anti-scratch, and the middle being two metal conductive layers disposed on the base layer and next to the inner surface of the plastic layer, respectively, the two conductive layers being spaced from each other by many minute (smaller than $1/1000$ inch) transparent separating points between them. When the screen is touched with a finger, the two conductive layers contact with each other at the touch point. The two metal conductive layers are operating faces of the touch screen, and two strips of silver paste are coated to both ends of each operating face respectively and referred to as a pair of electrodes for this operating face. If a voltage is applied to the pair of electrodes for one of the operating faces, a uniform and continuous distribution of parallel voltage will be formed on the operating face. When a prescribed voltage is applied to the pair of electrodes in the X axis direction, and no voltage is applied to the pair of electrodes in the Y axis direction, the voltage value at the touch point can be reflected on the Y+ (or Y−) electrode in the parallel voltage field along the X axis, and the coordinate of the touch point along the X axis can be obtained by measuring the voltage value of the Y+ electrode with respect to the ground. Similarly, when a voltage is applied to the pair of electrodes in the Y axis direction, and no voltage is applied to the pair of electrodes in the X axis direction, the coordinate of the touch point along the Y axis can be obtained by measuring the voltage value of the X+ electrode with respect to the ground. Finally, the coordinates of the pressure center point can be obtained by calculating the average of the coordinates of all touch points with a controller for the touch screen, and the subsequent operation is performed by simulating a mouse.

Since most people has been used to performing various operations with a mouse during their long-term usage of a computer, it has turned out to be an issue how to enable the use of a mouse on a touch screen. A satisfactory solution has been found for such functions as left-key function, dragging and the like, while the right-key function has not been implemented well. To be specific, in the current touch screen, to enable the right-key function of a mouse and thus meet the requirement of a user's habit of using a mouse, the touch-screen industry generally adopts a method of long-term clicking, that is, if a finger or a touch pen remains stationary for more than 1 second after moving to some position on the touch screen, the single clicking of the mouse right key will be automatically performed at the position of the mouse pointer. As the related study progresses, it is found that such method of realizing the right-key function of a mouse has the following problems. First, the method is inconsistent with most users' habit of using a mouse. Second, some users have been accustomed to click the touch screen with a strong force, and thus, with the above method, the users will feel a pain on their fingers. Third, the user needs to make a long-term click, usually beyond about 1 second, when activating the right-key function of the mouse, which costs the user a plenty of time since the mouse right key has a high frequency of usage. Fourth, since the above method requires a stagnation of about 1 second and the touch screen has a high sensitivity, a slight slip or movement of the finger during the user's operation may lead to a multifunction, for example, the phenomenon often occurs that the right-key function is activated long after the beginning of the required stationary status. Fifth, the right-key function will be enabled unexpectedly if the user unintentionally keeps his or her finger still for about 1 second.

SUMMARY OF THE INVENTION

In view of the above problems, the primary object of the present invention is to provide an input method for a touch screen so that the right-key operation of a mouse can be implemented on the touch screen in a convenient, rapid and accurate manner.

To achieve the above object, the solution of the present invention is made as follows.

An input method for a touch screen, comprising a first step of acquiring the coordinates of all current touch points on the touch screen, and the method further comprises steps of:

(a) comparing and determining whether the distance between any two of the uncompared touch points on the touch screen is greater than or equal to a preset distance, executing the right-key operation of a mouse at the current position of the pointer of the mouse and terminating the current processing flow if it is positive, otherwise proceeding to step (b) if it is negative;

(b) determining whether comparison has been made to the distances of all the touch points on the touch screen, and calculating the average of the coordinates of all the current touch points if they have been compared, otherwise returning to step (a).

In the above method, said step (a) of comparing and determining whether the distance between any two of the uncompared touch points on the touch screen is greater than or equal to a preset distance further comprises steps of:

(a11) calculating the distance between any two of the uncompared touch points on the touch screen;
(a12) comparing and determining whether the calculated distance between the two touch points is greater than or equal to the preset distance.

In the above method, said step (a) of comparing and determining whether the distance between any two of the uncompared touch points on the touch screen is greater than or equal to a preset distance further comprises steps of:

(a21) calculating the average of the coordinates of all the current touch points on the touch screen;
(a22) calculating the distance between the average and any one of the uncompared touch points on the touch screen;

(a23) comparing and determining whether the calculated distance between the average and the touch point is greater than or equal to the preset distance.

In the above method, if it is determined at said step (b) that there are still some touch points to be compared, said step (b) further comprises step of deleting from the comparison set of all the touch points to be compared the touch points which has been compared.

In the above method, said preset distance is greater than the distance by which the act of dragging is performed over a delay period as well as the distance between the touch points when an object touches the touch screen, and said preset distance is also shorter than or equal to the distance between two touch points spaced from each other as far as allowed on the touch screen.

In the above method, said object is a finger or a touch pen.

According to the above solution of the present invention, the right-key function is activated by comparing and determining whether the distance between any two of uncompared touch points on the touch screen is greater than or equal to the prescribed distance. This is fully consistent with most users' habit of using a conventional mouse and avoids the time waste and uncomfortableness due to a long-term click on the touch screen. Besides, the activation of the right-key function will not be disabled by any slight slip or movement. Further, it is possible to prevent the unexpected operation of the right-key function due to an unintentional stop. In summary, the present invention can implement the right-key function on the touch screen in a convenient, rapid and accurate manner.

DETAILED DESCRIPTION OF THE PRESENTLY PREFERRED EMBODIMENTS

Below, the implementation of the present invention method will be elaborated with respect to the figures and particular embodiments.

The First Embodiment

Figure 1:
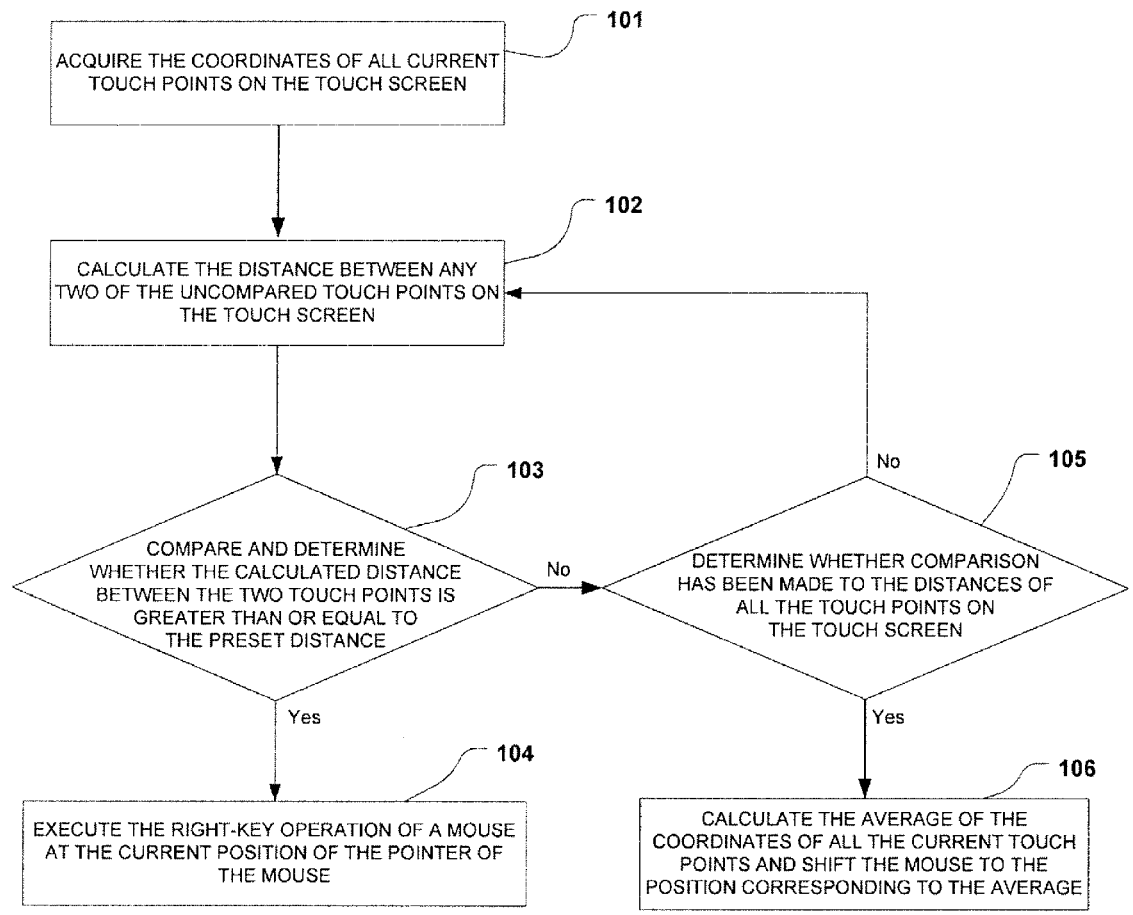
FIG. 1 is a flowchart for the first embodiment of an input method for a touch screen according to the present invention.

Referring to FIG. 1, a flowchart for the first embodiment of an input method for a touch screen according to the present invention is shown and comprises the following steps:

Step 101: when some position on the touch screen is touched by an object, the two metal conductive layers of the touch screen contact with each other at the touch position, which cause change in resistance and the generation of signals in the X axis and Y axis directions, and then the current coordinates of all touch points on the touch screen are obtained by the touch screen controller.

Here, the object can be a finger, a touch pen or the like, and a number of touch points are formed on the screen when it is touched by the object.

Step 102: the distance between any two of uncompared touch points on the touch screen is calculated.

Assuming that two fingers contact with the touch screen at the same time, and only two contact points are formed for each of the fingers, where the contact points for the first finger are A1 and A2 with the coordinates $(x_1, y_1)$ and $(x_2, y_2)$, and the contact points for the second finger are B1 and B2 with the coordinates $(x_3, y_3)$ and $(x_4, y_4)$. As the distance between any two of uncompared points on the touch screen, the distance h between points A1 and B2 can be calculated from the equation (1):

$$h=\sqrt{(x_1-x_4)^2+(y_1-y_4)^2} \tag{1}$$

Similarly, the distance between any other two of uncompared points on the touch screen can also be calculated.

Step 103: the calculated distance between the two touch points is compared with a preset distance, and step 104 will be executed if the distance is greater than or equal to the preset distance, otherwise the flow proceeds to step 105.

Step 104: the single clicking of the mouse right key is executed at the current position of the mouse pointer, and then the flow is completed.

Step 105: it is determined whether the distances of all touch points on the touch screen have been compared, and the flow turns to step 106 if it is positive, otherwise the flow returns to step 102.

Step 106: the average of the current coordinates of all the touch points is computed, and then the mouse is shifted to the position corresponding to the average.

Taking the above mentioned contact points A1, A2, B1 and B2 as an example, the position to which the mouse is shifted has coordinates (x, y) resulting from the equation (2):

$$x=\frac{x_1+x_2+x_3+x_4}{4} \quad y=\frac{y_1+y_2+y_3+y_4}{4} \tag{2}$$

The present invention further proposes the second embodiment, in which the calculation of the distance between any two uncompared touch points on the touch screen is simplified as particularly illustrated hereafter.

The Second Embodiment

Figure 2:
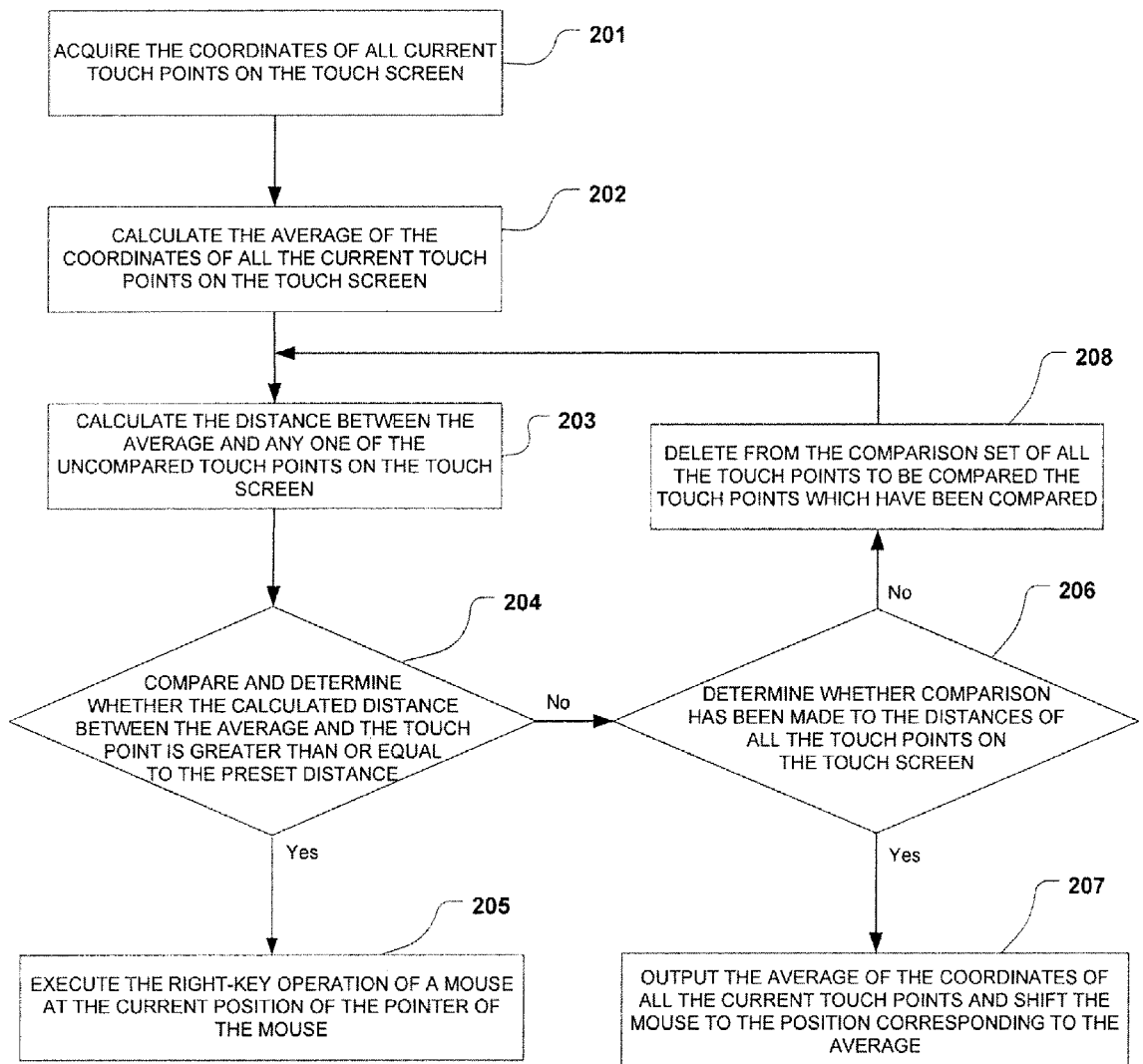
FIG. 2 is a flowchart for the second embodiment of an input method for a touch screen according to the present invention.

Referring to FIG. 2, a flowchart for the second embodiment of an input method for a touch screen according to the present invention is shown and comprises the following steps:

Step 201: when some position on the touch screen is touched by a finger or a touch pen, the two metal conductive layers of the touch screen contact with each other at the touch position, which cause change in resistance and the generation of signals in the X axis and Y axis directions, and then the current coordinates of all touch points on the touch screen are obtained by the touch screen controller.

Step 202: the average of the current coordinates of all the touch points on the touch screen is computed.

Assuming that two fingers contact with the touch screen at the same time, and only two contact points are formed for each of the fingers, where the contact points for the first finger are A1 and A2 with the coordinates $(x_1, y_1)$ and $(x_2, y_2)$, and the contact points for the second finger are B1 and B2 with the coordinates $(x_3, y_3)$ and $(x_4, y_4)$. The average coordinates $(x_{ave}, y_{ave})$ of the four touch points on the touch screen can be obtained from the equation (3):

$$x_{ave}=\frac{x_1+x_2+x_3+x_4}{4} \quad y_{ave}=\frac{y_1+y_2+y_3+y_4}{4} \tag{3}$$

Step 203: the distance between the average and any one of uncompared touch points on the touch screen is computed.

Taking the above mentioned contact points A1, A2, B1 and B2 as an example, as the distance between the average and any one of uncompared touch points on the touch screen, the distance h' between the average and the uncompared point B2 can be computed from the equation (4):

$$h'=\sqrt{(x_4'-x_{ave})^2+(y_4-y_{ave})^2} \quad (4)$$

Similarly, the distance between the average and any other uncompared touch point on the touch screen can also be calculated in the above way.

Step 204: the calculated distance between the average and one of the touch points is compared with a preset distance, and step 205 will be executed if the distance is greater than or equal to the preset distance, otherwise the flow proceeds to step 206.

Step 205: the single clicking of the mouse right key is executed at the current position of the mouse pointer, and then the flow is completed.

Step 206: it is determined whether the distances of all touch points on the touch screen have been compared, and the flow turns to step 207 if it is positive, otherwise the flow returns to step 208.

Step 207: the average of the current coordinates of all the touch points is outputted, and then the mouse is shifted to the position corresponding to the average and the current flow is completed.

Step 208: any compared touch point is deleted from the comparison set composed of all touch points to be compared so that the calculation can be implemented with a simplified process and an increased response speed; and then the flow returns to step 203.

With the intention to enable a right-key operation based on any one of the above embodiments, an operator can first move his or her finger or touch pen to where the right-key function is to be activated, and the mouse arrow is also shifted to the corresponding position. Then, with the finger keeping touch with the touch screen, the operator touches the touch screen with another finger at a further position which is spaced from the previous position by a distance greater than the preset distance. Automatically, such action enables a single click of the mouse right key at the position of the mouse arrow, thereby facilitating the manipulation of the operator.

Meanwhile, the present invention is also compatible with two existing operations without any influence on them. The details are given as follows.

By example of the case which the operation of click-lift-click again is performed with a finger, the present invention imposes no effect on this operation since the phenomenon never happens that two touch points emerge on a touch screen simultaneously with a distance greater than a preset distance between them.

In the operation of, for example, dragging, the right-key function is not triggered as long as the distance by which a finger moves is shorter than a preset distance over a predetermined delay period. This reason is that the delay period must be short enough that the right-key function should not be triggered by the act of dragging.

It is obvious that the preset distance should be longer than the distance of dragging over the delay period as well as the distance between any two of touch points generated when an object, such as a finger or a touch pen, gets contact with the touch screen. Also, the preset distance should shorter than or equal to the distance between two touch points spaced from each other as far as allowed on the touch screen.

The above description illustrates the present invention by way of preferred embodiments and should not be construed as limiting the scope of the present invention. Based on the foregoing explanation of the technical solution and the preferred embodiments of the present invention, various potential changes or substitutions can be made and should belong to the scope defined by the claims.

What is claimed is:

1. An input method for a touch screen, comprising a first step of acquiring the coordinates of all current touch points on the touch screen, the method is characterized in that it further comprises steps of:
   (a) comparing and determining whether the distance between any two of the uncompared touch points on the touch screen is greater than or equal to a preset distance, executing the right-key operation of a mouse at the current position of the pointer of the mouse and terminating the current processing flow if it is positive, otherwise proceeding to step (b) if it is negative;
   (b) determining whether comparison has been made to the distances of all the touch points on the touch screen, calculating the average of the coordinates of all the current touch points if they have been compared, shifting the mouse to the position corresponding to the average, otherwise returning to step (a).

2. The method according to claim 1, wherein said step (a) of comparing and determining whether the distance between any two of the uncompared touch points on the touch screen is greater than or equal to a preset distance further comprises steps of:
   (a11) calculating the distance between any two of the uncompared touch points on the touch screen;
   (a12) comparing and determining whether the calculated distance between the two touch points is greater than or equal to the preset distance.

3. The method according to claim 1, wherein said step (a) of comparing and determining whether the distance between any two of the uncompared touch points on the touch screen is greater than or equal to a preset distance further comprises steps of:
   (a21) calculating the average of the coordinates of all the current touch points on the touch screen;
   (a22) calculating the distance between the average and any one of the uncompared touch points on the touch screen;
   (a23) comparing and determining whether the calculated distance between the average and the touch point is greater than or equal to the preset distance.

4. The method according to claim 3, wherein if it is determined at said step (b) that there are still some touch points to be compared, said step (b) further comprises step of deleting from the comparison set of all the touch points to be compared the touch points which have been compared.

5. The method according to claim 1, wherein said preset distance is greater than the distance by which the act of dragging is performed over a delay period as well as the distance between the touch points when an object touches the touch screen, and said preset distance is also shorter than or equal to the distance between two touch points spaced from each other as far as allowed on the touch screen.

6. The method according to claim 5, wherein said object is a finger or a touch pen.

* * * * *